Dec. 29, 1959     R. W. DODGE     2,919,156
COLLAPSIBLE CAB STRUCTURE
Filed Oct. 25, 1957     3 Sheets-Sheet 1

INVENTOR.
BY Robert W. Dodge
ATTORNEY

Dec. 29, 1959     R. W. DODGE     2,919,156
COLLAPSIBLE CAB STRUCTURE
Filed Oct. 25, 1957     3 Sheets-Sheet 2
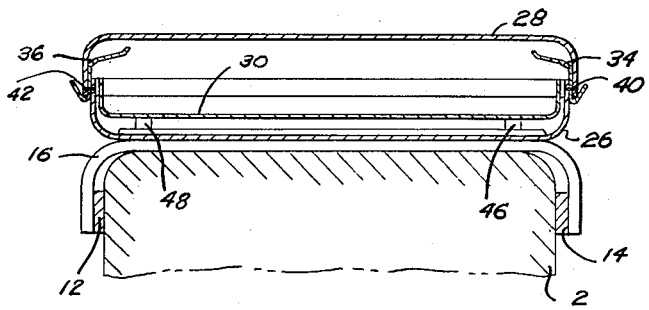
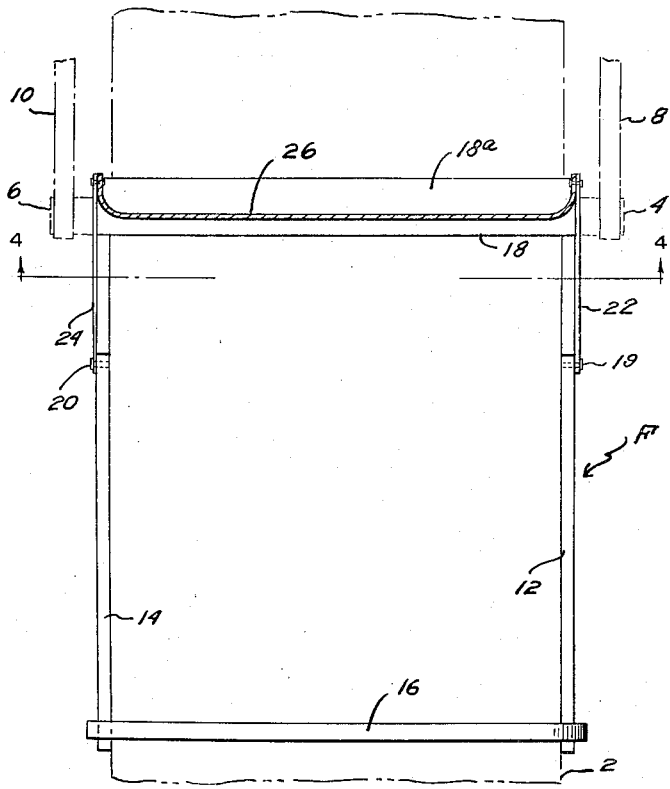
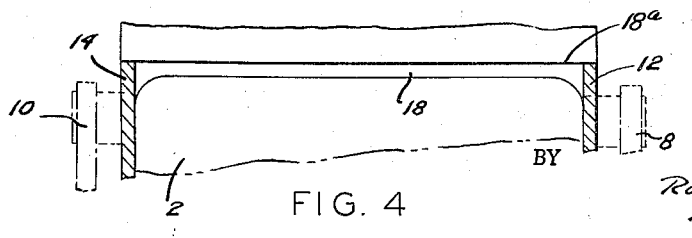
INVENTOR.
Robert W. Dodge
M. H. Hamilton
ATTORNEY Dec. 29, 1959 R. W. DODGE 2,919,156
COLLAPSIBLE CAB STRUCTURE
Filed Oct. 25, 1957 3 Sheets-Sheet 3
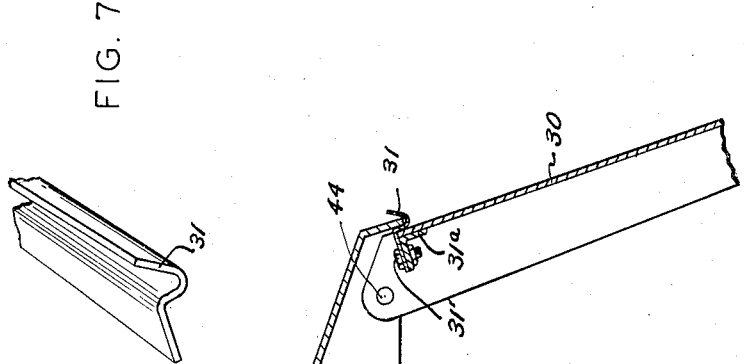
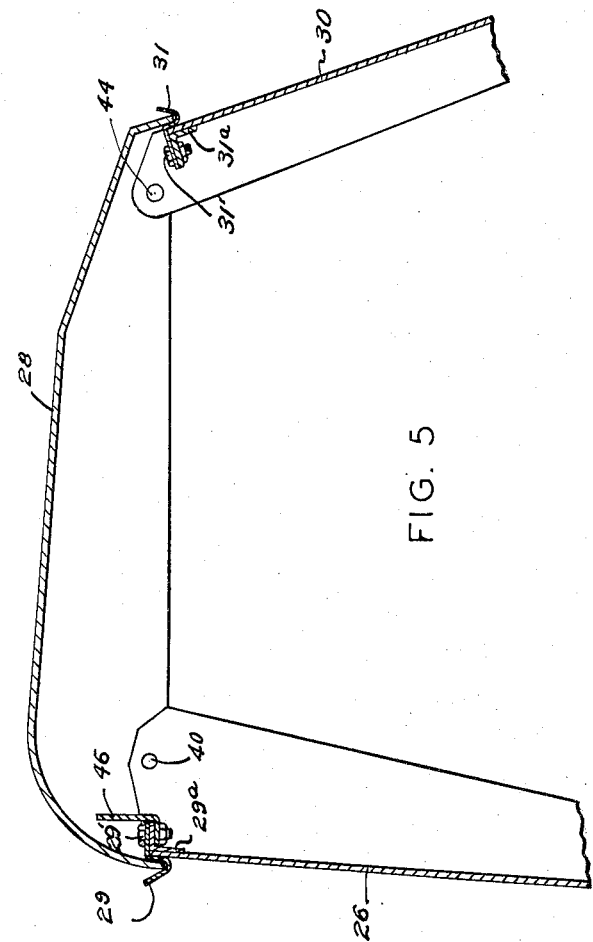
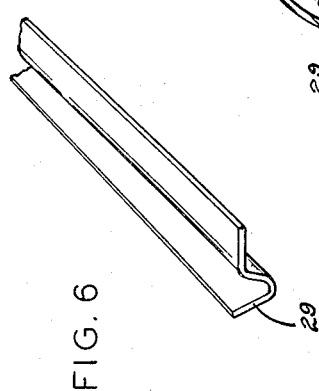
INVENTOR.
Robert W. Dodge
BY
M. H. Hamilton
ATTORNEY

United States Patent Office 2,919,156
Patented Dec. 29, 1959

2,919,156

COLLAPSIBLE CAB STRUCTURE

Robert W. Dodge, Wenham, Mass.

Application October 25, 1957, Serial No. 692,301

4 Claims. (Cl. 296—107)

This invention relates to cab structures and, in particular, a collapsible cab structure for use with earth moving equipment such as tractor shovels, front end loaders, and similar machines.

In certain types of earth moving equipment, such as is exemplified by tractor shovels, it is desirable to provide for the operator a protective cab enclosure which is available for use under certain unfavorable weather conditions and which is of a construction so arranged as to cause a minimum of interference with the visibility of the operator, particularly at those areas lying immediately in front of the power driven shovel or blade. For such purposes, it has been customary to provide a detachable rigid cab structure which can be removably secured about the operator's seat in a convenient manner and which can be readily taken off when the use of a protective enclosure is not required. However, there are some occasions where the operation of completely removing the cab structure is not justified and, yet, for short periods the operator would like to drop the enclosure cab down out of his line of sight.

With the general objective of improving this type of cab arrangement in mind, I have conceived of a novel cab construction which can be removably secured to an earth moving machine and which can, while thus secured in place, be collapsed and folded upon itself in a compactly stored position with a limited number of adjustments. As a result, the operator can at will arrange the cab structure in a raised position or a fully collapsed position with a minimum of effort and in a very short interval of time.

In one desirable embodiment of the collapsible cab structure of the invention, I have devised a special attaching frame which is designed to be readily secured above the body portion of a front end loader, for example. I have further devised a novel organization of folding cab components which are conveniently pivoted in one another to facilitate a nested arrangement. In this nested arrangement the cab components occupy very little space and they lie, as a unit, in back of the operator completely out of his line of sight, while at the same time avoiding interference with the breather tubes customarily projecting from the upper side of the front end loader at this area.

An important feature of this collapsible cab unit is provision of a special cab top component which not only constitutes a drip proof top or cab roof when fully assembled, but also affords an equally effective shelter for the entire cab unit, including a windshield section, when in a fully collapsed and folded state. This cab top component also is formed with supporting rack elements for receiving side curtains in a stored position.

Further included in the arrangement for folding the components within one another is a special stop mechanism which is so arranged as to locate the components in spaced relation to one another and thus the possibility of damage to glass windows or other parts in the course of a long wearing life or from rough handling is greatly minimized and the operator is not required to exercise any more than ordinary care in moving the components into and out of a collapsed position.

These and other objects and novel features will be more fully understood and appreciated from the following description of a preferred embodiment of the invention shown attached to a front end loader in the accompanying drawings, in which:

Fig. 2 is a cross-sectional view taken on the line 2—2 of Fig. 1;

Fig. 3 is a plan cross-sectional view taken on the line 3—3 of Fig. 1;

Fig. 4 is another cross-sectional view taken on the line 4—4 of Fig. 3;

Fig. 5 is an enlarged elevational view;

Fig. 6 is a detail perspective view; and

Fig. 7 is another detail perspective view.

Figure 1:
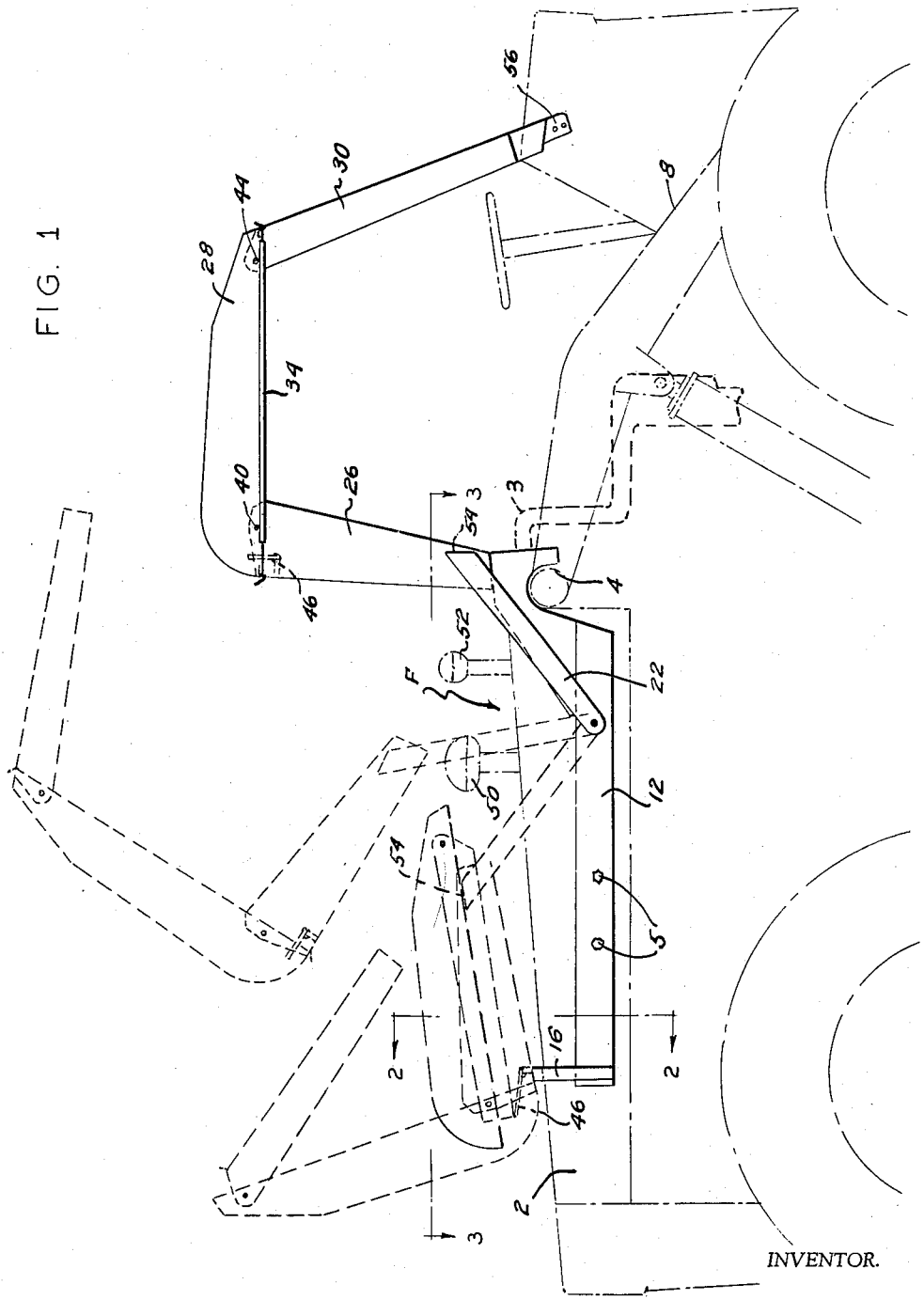
Fig. 1 is a view in side elevation of an earth moving machine of the front end loader class, and illustrates the collapsible cab construction of the invention associated therewith and indicated in broken lines at several intermediate positions of adjustment.

Considering in greater detail the structure shown in these figures, numeral 2 denotes the body portion of an earth moving machine of the front end loader class in which is provided an operator's seat 3. At either side of the body portion are bearing members 4 and 6 which have pivotally mounted thereon a pair of hydraulically operated arms 8 and 10 of conventional character. A blade or bucket is supported between the front ends of said arms in the usual manner.

In accordance with the invention, I utilize that part of the body portion 2 occurring immediately in back of the operator's seat as a main bearing section on which I mount an attaching frame generally denoted by the arrow F and this frame F in turn receives and supports the collapsible cab unit in either a folded or fully extended position. The frame F may be detachably secured in any desired manner, as by means of fastenings 5, which extend through openings formed in the body portion 2.

As is more clearly shown in Fig. 3, the frame F is of rectangular form and includes two opposite sides 12 and 14 of steel or other desired material which, at their rearmost extremities, are joined together by a transverse U-shaped bar 16 secured, for example, by welding. The member 16 projects well above the sides 12 and 14 to provide rest or support against which a part of the collapsible cab unit may be received, as hereinafter described. The U-shape of bar 16 in general conforms to the curved contour of the body portion 2, as best shown in Fig. 2.

At their forward ends the sides 12 and 14 are further formed with enlarged hooked extensions designed to project over respective bearings 4 and 6, as is best shown in Fig. 1, and joining these hooked extensions in solidly braced relationship is a transverse beam element 18 presenting an upper seating surface 18a on which the cab unit may be suitably supported in an operative position.

Pivotally mounted on the frame sides 12 and 14, at 19 and 20, are a pair of adjustment arms 22 and 24 which project forwardly in an inclined position and having their extremities solidly secured to the special collapsible cab unit of the invention. Included in the collapsible cab unit is a rear wall section 26, a top section 28 and a front windshield section 30. An important feature of this collapsible cab unit is the construction of the top section in an overall width which exceeds the width of both the rear wall section and the front windshield section so that both of the latter parts may be contained within the top.

Another desirable feature is the manner in which the top cab section 28 is attached to the remaining cab unit components. In this latter connection, attention is directed to Fig. 2 wherein I have illustrated the cab components in a fully collapsed position wherein the rear wall section 26 is contained within the opposite sides of the top section 28 and the windshield section 30 is contained in turn within the rear wall section 26.

In thus utilizing the top section as the outermost component of the nested unit, I have further devised a special reinforcing structure for this top section including two oppositely located strips of steel or other suitable material indicated by numerals 34 and 36 in Fig. 2. These strips may be of a length slightly less than the lengths of the top section 28 and they are formed with a reversely curved shape so chosen as to extend along both the inner surface and the outer surfaces of the top section 28, and thus perform several functions. Those reversely curved portions which extend along external surfaces of the top 28 constitute channel forming elements or so-called drip guards. Portions of the strips which extend along the inner surfaces of the top section 28 constitute stiffening elements for the top and at the same time provide a bearing portion through which may be received pivot pins 40 and 42 employed in pivotally attaching the top section on the rear wall section 26. Finally, the strips 34 and 36 project angularly inwardly as shown in Fig. 2 to constitute a retaining rack which, in conjunction with the upper portions of the top 28, conveniently contains side curtains of the class normally used in cab devices.

Another pair of reversely curved strips 29 and 31 (Figs. 5, 6 and 7) are solidly secured to the front and rear edges of the top component 28 to constitute drip edges along the front and rear portions of this component.

The strip 29, as shown in Fig. 6, is formed with an outer channel shape and an inwardly extending flange portion which is adapted when attached to the cab top to extend up inside of the top cab component edge to overlie an angle iron reinforcement element 29a welded or otherwise secured to the rear wall component 26. A bolt 29' passes through the flange and angle iron. The angle iron, together with additional bolts, may be employed to fasten edges of the stops 46 and 48 in one preferred form of the invention, and stop 46 has been illustrated in Fig. 5 in this secured relationship. Similarly, the strip 31 is secured at the front edge of the top cab component by an angle iron 31a and a bolt 31'.

The reinforced structure with the strips 29 and 31 described is particularly devised to perform a second important function consisting of protecting the front and rear edges of the top cab component against bending, twisting or otherwise being distorted as a result of repeated lifting forces being exerted by one pivoted component against another when these components are raised upwardly in the course of collapsing the structure.

It will be observed that, as a lifting force is first exerted on the windshield section, the strip edge will be first contacted and forces are thus distributed along this reversely curved strip so that there is no chance for the edge of the top cab component to be bent or twisted. At the same time, as the rear portion of the top cab component is forced rearwardly, the strip 29 performs a similar protective function so that no bending or twisting of the rear edge can occur. By means of these two strips, therefore, a rigid and durable collapsing arrangement of parts is realized and danger of undesirable wear is prevented.

The windshield section 30 is pivotally secured on pivot pins 44 and, when completely folded back into a fully collapsed position, such as shown in Fig. 2, the lower extremity of the windshield section 30 is received upon a pair of stops 46 and 48 which are illustrated in Figs. 1 and 2. These stops are solidly secured by welding or other desirable means at two opposite inner surfaces of the rear wall 26 in a position such that, when the cab unit, together with the supporting arms 22 and 24, is swung rearwardly into the collapsed position indicated in broken lines at the left-hand side of Fig. 1, the lowermost surface of the rear wall 26 comes to rest against the bar 16. In this particular position, the ends of the windshield section 30 will just fall upon the stops 46 and 48 with the windshield element itself being protectively spaced away from the remaining cab components or the body portion of the tractor, and thus accidental breakage or injury may be prevented.

In Fig. 1, I have shown the cab unit in several different positions of adjustment indicated in broken lines. The first position shows particularly the cab unit passing over the breather tubes 50 and 52 without interference with those parts. The remaining positions of adjustment show steps in moving the cab unit into a completely collapsed position with the top cab component 28 coming to rest against beveled edges 54 of the pivoted arms 22 and 24. This provides a solid support for the cab unit when in a compacted position.

In securing the cab unit in a working position, the lower ends of the windshield section 30 may be secured to the tractor body in any desired manner as, for example, by means of permanently attached brackets as 56 to which the ends are bolted.

Although I have disclosed and described one preferred embodiment of a collapsing cab unit and have particularly constructed this unit so as to conveniently fit over the top portion of one particular form of tractor shovel machine, it should be understood that various other arrangements of collapsing cab unit in any of its varying forms may be combined with other types of earth moving machines where a cab enclosure is desirable.

From the foregoing description, it will be evident that I have provided a novel, efficient and convenient cab enclosure unit which may be very quickly adjusted from an operative position to a completely compacted or collapsed position. No interference with other parts of the tractor shovel body occurs, nor is there any need for providing special structures in the cab body other than pins for receiving bolts or other threaded fastenings. It is particularly pointed out that the nature of the construction is such that lightness and durability may be realized with a highly desirable measure of safety and visibility in a position of usage of the cab unit.

The appended claims define the scope of modifications which are to be practiced in keeping with the spirit of the invention.

Having thus described my invention, what I claim is:

1. In an earth moving machine comprising a body, an operator's seat carried by the body, said body having a portion extending rearwardly of and spaced from said seat, the combination of a collapsible enclosure unit adapted to form a cab about said seat and to be moved as a unit into collapsed position rearwardly of the seat, a frame for supporting said enclosure unit when in collapsed position rearwardly of said seat, said frame including spaced side supporting members fixed to said body portion at the rear of and spaced from said seat, and elongated arms pivoted to said spaced side members at their forward end portions and rigidly fixed to said enclosure unit at opposite side portions, said arms being of such length as to swing said enclosure unit from its collapsed position above said spaced side supporting members to an open position enclosing said seat, said enclosure unit including a rear wall section, a top wall section and a front wall section, said front wall section and said rear wall section being movable when the parts are collapsed to a position within and beneath said top section.

2. The structure of claim 1 characterized in that the elongated arms which are pivoted to the spaced side members are rigidly secured to the bottom portion of the rear wall section of the enclosure unit.

3. The structure of claim 1 characterized in that the top section of the enclosure unit is provided with downturned marginal portions at its sides and elongated strips of reversely curved shape in cross section underlie the marginal edges and project upwardly at each side thereof to define trough shape portions at the outside and supporting portions at the inside.

4. The structure of claim 1 characterized in that the front and rear marginal portions of the top include downturned edges and marginal strips are provided along these edges defining outer troughs and inwardly projecting reinforcing flanges.

References Cited in the file of this patent

UNITED STATES PATENTS

| 258,055 | Gross | May 16, 1882 |
| 1,334,313 | Ostruk | Mar. 23, 1920 |
| 2,795,458 | Wieschel | June 11, 1957 |

FOREIGN PATENTS

| 634,055 | France | Feb. 9, 1928 |
| 557,699 | France | Aug. 13, 1923 |
| 19,949 | Great Britain | Sept. 7, 1911 |
| 200,352 | Great Britain | July 12, 1923 |